United States Patent Office 3,370,031
Patented Feb. 20, 1968

3,370,031
PROCESS FOR PREPARING VINYL CHLORIDE-VINYL ESTER COPOLYMER LATICES
Einte P. Grommers and Geert C. Vegter, Amsterdam, Netherlands, assignors to Shell Oil Company, New York, N.Y., a corporation of Delaware
No Drawing. Filed Mar. 9, 1964, Ser. No. 350,528
Claims priority, application Netherlands, Mar. 11, 1963, 290,024
9 Claims. (Cl. 260—29.6)

This invention relates to a process for the preparation of latices by emulsion polymerization of vinyl esters of saturated monocarboxylic acids. More particularly, the invention provides a process for copolymerizing vinyl chloride-vinyl esters of saturated aliphatic monocarboxylic acids branched at the alpha position with alpha-beta-unsaturated carboxylic acids and/or partial esters thereof in an aqueous emulsion containing surfactants.

Specifically the invention provides a process for preparing mechanically stable, freeze-tolerant latices which comprises polymerizing in aqueous emulsion vinyl esters of alpha-branched saturated aliphatic monocarboxylic acids in the presence of (A) a compound selected from the group consisting of alpha-beta-unsaturated carboxylic acids, mono-alkyl esters of alpha-beta-unsaturated carboxylic acids, monovinyl esters of saturated aliphatic dicarboxylic acids, and the salts and anhydrides of said carboxylic acids and esters, and (B) surfactants consisting essentially of surface-active agents containing one anionic group per molecule and nonionic surface-active agents.

The preparation of latices by emulsion copolymerization of vinyl chloride with vinyl esters of saturated aliphatic monocarboxylic acids such as vinyl acetate is a known technique. Such latices find wide application, but not as paint latices.

It has been found that dispersing systems recommended for the preparation of these copolymers, in general, do not lead to the formation of stable latices when they are applied in the emulsion copolymerization of vinyl chloride with vinyl esters of the alpha-branched saturated aliphatic monocarboxylic acids. Sufficient stability may in some cases be obtained by applying large quantities of dispersing agents, but at the expense of the water resistance of the products made from such latices.

A process has now been found for the preparation of latices having good stability and which are also suitable for the preparation of paint coats possessing great resistance to mechanical and chemical influences. According to this process vinyl chloride is copolymerized in an emulsion in water with vinyl esters of saturated aliphatic monocarboxylic acids of which at least part of the carboxyl groups is attached to tertiary and/or quaternary carbon atoms, in the presence of carboxylic acids or partial carboxylic esters, in which carboxylic acids or partial esters occurs a pair of carbon atoms bound by a double bond, one at least being attached directly to a carboxyl group, or salts or anhydrides thereof, as well as of surface-active substances which contain an anionic group per molecule and of nonionic surface-active substances. Before, during or after polymerization the usual polyvinyl chloride stabilizers may, if desired, be added.

It is therefore an object of the present invention to provide a process for preparing paint latices by aqueous emulsion polymerization. It is another object to provide a process for preparing vinyl chloride-vinyl ester copolymer latices which are not only suitable for use as paints but also have unexpectedly high resistance to mechanical forces such as vigorous stirring and freeze-thaw resistance and high resistance to chemical influences such as electrolytes and salts. These and other objects will become apparent to those skilled in the art from the following disclosure.

These and other objects are accomplished by the process for preparing mechanically stable, freeze-tolerant latices which comprises polymerizing in aqueous emulsion vinyl esters of alpha-branched saturated aliphatic monocarboxylic acids in the presence of (A) a compound selected from the group consisting of alpha-beta-unsaturated carboxylic acids, mono-alkyl esters of alpha-beta-unsaturated carboxylic acids, monovinyl esters of saturated aliphatic dicarboxylic acids, and the salts and anhydrides of said carboxylic acids and esters, and (B) surfactants consisting essentially of surface-active agents containing one anionic group per molecule and nonionic surface-active agents.

Suitable alpha-beta-unsaturated carboxylic acids include, among others, acrylic acid, methacrylic acid, maleic acid, fumaric acid and itaconic acid. Instead of these carboxylic acids certain partial carboxylic esters may be used, such as mono-alkyl esters of maleic acid, fumaric acid and itaconic acid and also monovinyl esters of saturated aliphatic dicarboxylic acids, such as monovinyl succinate. Such acids or partial esters may also be applied in the form of salts, such as sodium, potassium or ammonium salts. Quantities between 0.5 and 5 parts by weight of acid or partial ester per 100 parts by weight of monomers are in general suitable. Preference is given to acrylic acid and methacrylic acid.

The saturated aliphatic monocarboxylic acids whose carboxyl groups are attached to tertiary and/or quaternary carbon atoms will for the sake of convenience be referred to herein as branched or alpha-branched monocarboxylic acids.

The preferred alpha-branched saturated aliphatic monocarboxylic acids suitable for use in the present invention may be represented by the general formula:

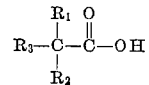

Wherein $R_1$ and $R_2$ each represent the same or different alkyl radicals of normal, branched or cyclic structure and $R_3$ represents hydrogen or a hydrocarbyl radical. In the formula $R_1$ and $R_2$ each may represent a member of the group consisting, for example, of methyl, ethyl, propyl, butyl, pentyl, octyl, decyl, and the like, radicals. Hydrocarbyl radicals may comprise, for example, alkyl radicals of normal, branched or cyclic structure including methyl, ethyl, propyl, butyl, pentyl, hexyl, octyl, as well as alkaryl, aralkyl and aryl radicals.

Suitable such monocarboxylic acids are those having from 4 to about 20 carbon atoms in the molecule with from about 9 to about 19 being especially preferred.

Under the above-mentioned conditions small quantities of dispersing agents already ensure sufficient stability. Of the anionic surface-active substances a quantity of at least 0.5 part by weight per 100 parts by weight of vinyl esters is also preferably used. In some cases smaller quantities may be applied, but often these are not sufficiently effective. In general, quantities between 0.5 and 2 parts by weight per 100 parts by weight of vinyl esters are preferred.

Suitable surface-active agents that contain one anionic group per molecule are, for instance, alkylaryl sulfonates, such as alkylbenzene sulfonates. Such alkylbenzene sulfonates can be prepared by such known processes as alkylation of benzene with, for instance, propene tetramer, straight-chain olefins, or chlorinated kerosine, followed by sulfonation and neutralization of the resultant sulfonic acid; if so desired, disulfonic acid and sulfuric acid salts may be removed. Other suitable anionic surface-active agents are, for instance, salts of sulfosuccinic esters, such as dihexyl ester, dioctyl ester and ditridecyl ester. Other anionic surface-active agents are, for instance, alkyl sulfonates, alkyl sulfates, sulfates of hydroxyethyl esters of monocarboxylic acids, sulfates of alkylphenoxypolyethoxyethanols, sulfates or sulfonates of hydroxypropyl esters of monocarboxylic acids and sulfates of monoglycerides of monocarboxylic acids. Compounds in this category that contain 12 to 24 carbon atoms per molecule are preferred. Salts of monocarboxylic acids, such as palmitic acid, stearic acid or monocarboxylic acids branched at the alpha position and containing 9–19 carbon atoms per molecule may also be considered. Furthermore, if so desired, mixtures of the aforesaid anionic surface-active agents can be applied.

Suitable nonionic surface-active agents are, for instance, reaction products of hydroxy compounds with one or more alkylene oxides, such as ethylene oxide and propylene oxide. Very suitable are reaction products of phenols with alkylene oxides, such as reaction products of the general formula:

in which R stands for an alkyl group with 6–16 carbon atoms and $n$ is a number between 6 and 40. Compounds in which R represents an octyl or a nonyl group are preferred. Such compounds can be prepared by known means by alkylation of phenol with olefins, such as diisobutene or propene trimer, followed by reaction with ethylene oxide. This generally yields mixtures of reaction products, which mixtures may be effectively characterized by the average length of the ethene-oxy chain.

Other suitable nonionic surface-active agents are reaction products of ethylene oxide with polypropylene glycol ethers. Compounds obtained by reaction of 60–90 parts by weight of ethylene oxide per 100 parts by weight of product, are preferred.

Other suitable nonionic surface-active agents are reaction products of ethylene oxide with monocarboxylic acids, such as lauric acid, palmitic acid, stearic acid or mixtures of fatty acids; furthermore, reaction products of ethylene oxide with alcohols, such as octyl alcohol, lauryl alcohol or cetyl alcohol.

If desired, mixtures of the above-mentioned nonionic surface-active agents may also be applied. The quantity of nonionic surface-active substance or substances may, in general, be between 0.5 and 6% by weight, as referred to vinyl esters. Amounts between 1 and 3% by weight are preferred.

According to the invention the above-mentioned dispersion systems may be used for emulsion copolymerization of vinyl chloride with vinyl esters of branched monocarboxylic acids, or for emulsion copolymerization of vinyl chloride with other monocarboxylic acids with other vinyl esters. Such vinyl esters may be prepared by known means from the monocarboxylic acids, for instance by reaction of the acids with acetylene in the presence of zinc silicates, cadmium silicates or mercury compounds. Many vinyl esters can also be prepared by reaction of the acid with vinyl acetate in the presence of a mercury salt.

As saturated aliphatic monocarboxylic acids in which the carboxyl groups are attached to tertiary and/or quaternary carbon atoms use may well be made of the monocarboxylic acids which are obtained by the reaction of formic acid, or of carbon monoxide and water, with olefins under the influence of liquid acid catalysts, such as sulfuric acid, phosphoric acid or complex compounds of phosphoric acid, boron trifluoride and water. Such monocarboxylic acids can also be prepared in the presence of the catalysts just mentioned by the reaction of formic acid, or of carbon monoxide and water, with paraffins, if hydrogen acceptors are also present. As hydrogen acceptors may serve olefins and, furthermore, compounds from which olefins are easily formed, such as alcohols and alkyl halides. Monocarboxylic acids branched at the alpha position can also be obtained according to Reppe's method. Of particular value are the acids from monoolefins with 8–18 carbon atoms. Preferably, mixtures of olefins obtained by cracking paraffinic hydrocarbons, for instance, mineral oil fractions are used as base materials. These mixtures may contain both branched and unbranched acyclic olefins as well as cycloaliphatic olefins. By the reaction with formic acid, or with carbon monoxide and water, a mixture of saturated acyclic and cycloaliphatic monocarboxylic acids is obtained therefrom. The base material may also be olefins obtained by polymerization of lower olefins, for instance, dimers, trimers or tetramers of propane, or else dimers of isobutene.

By a suitable choice of nature and quantity of the monomeric vinyl compounds one may obtain a dispersion whose particles in the paint coat may, when the water is evaporated, coalesce even at room temperature. This can be realized, for example, by starting from vinyl esters of branched monocarboxylic acids, which contain at least seven carbon atoms per molecule, together with vinyl chloride. If the branched monocarboxylic acids contain 9–11 carbon atoms per molecule, the desired results may be expected if 50–900 parts by weight of their vinyl esters are combined with 100 parts by weight of vinyl chloride. For application in latex paints the best results are obtained when 175–225 parts by weight of the above-mentioned vinyl esters of branched monocarboxylic acids are combined with 100 parts by weight of vinyl chloride.

Other vinyl esters which may be used together with vinyl chloride are those derived from the following branched monocarboxylic acids: acids prepared by reaction of carbon monoxide and water with cracked olefins containing 6–8 carbon atoms per molecule, with cracked olefins containing 12–14 carbon atoms per molecule, with cracked olefins containing 14–18 carbon atoms per molecule, with propylene trimer or with propylene tetramer.

Vinyl ester mixtures specified in the previous paragraph may be applied separately as such or combined.

Monomeric vinyl esters and their mutual ratio can be chosen in such a way that polymer particles thereof can coalesce at temperatures different from room temperature, for example, to prepare latices for stoving enamels, for glues, or for the preparation of articles such as sheets, plates and the like.

The polymerization or copolymerization can be initiated and/or catalyzed by customary means. As a rule substances are added which yield radicals such as peroxides, for example, benzoyl peroxide and ditertiary butyl peroxide, other per compounds, such as potassium persulfate and hydrogen peroxide and diazo compounds, such as alpha-alpha'-azoisobutyric nitrile. Frequently also redox systems are used. The temperature is usually between 30 and 150° C., in particular between 50 and 90° C. The polymerization can also be promoted by irradiation, in particular with ultra-violet light.

Polymerization and copolymerization of the vinyl ester mixtures concerned are in general exothermic. The pressure at which the process is performed is chosen such that during polymerization no boiling phenomena occur.

The polymerization is preferably carried out with exclusion of oxygen or air. For this purpose base materials such as water and vinyl esters can be previously freed from oxygen, as, for example, by boiling or distillation while passing through indifferent oxygen-free gases, such as nitrogen, helium, argon or neon. The air is preferably removed beforehand from the reaction equipment by one of the above-mentioned inert gases.

The polymerization can be effected in various ways, both batchwise and continuously with constant supply and discharge of material. In a batchwise process all the constituents can be combined, after which the polymerization is caused to proceed by adjusting the temperature. Also, one or more of the components may, if desired, be added during polymerization, either gradually or in parts.

Preferably, a vinyl ester monomer emulsion is previously prepared at a temperature at which no polymerization occurs; subsequently part of the monomer emulsion in the reactor is brought to a temperature at which polymerization occurs, and then the remaining quantity of monomer emulsion may be gradually added. Also, one may, if desired with dispersing agents and initiators, first bring the water in the reactor to reaction temperature after which monomer emulsion is gradually added. The time necessary for complete polymerization is dependent on the initiator system chosen and on the temperature, and may vary from some tens of minutes to a few hours.

Very suitable are also continuous embodiments in which during polymerization material is continually supplied or discharged, the mixture being kept homogeneously distributed in one or more reaction spaces, and the composition of the mixture in each reaction space being kept almost constant. Also in these cases a monomer emulsion containing all the constituents is preferably prepared beforehand. In this way a very great uniformity of temperature and other reaction conditions can be achieved. In general one reactor is sufficient for such continuous processes. If desired, one may also take a series of two or more of such reactors, in which, for example, different temperatures can be maintained in the second and the following reactors. One may also, to complete the polymerization, pass a latex which after polymerization in one reactor as described above still contains small quantities of monomeric vinyl esters, through a tubular reactor kept at a suitable temperature, for example 5 to 10° C. higher than the temperature in the main reactor.

The monomer emulsion to be polymerized may also be passed through one or more tubular reactors, heating and/or cooling ensuring uniform temperatures in each of the reactors or in separate parts thereof.

Latices prepared according to the invention differ from other copolymers of vinyl chloride with vinyl esters of carboxylic acids by increased stability to hydrolysis and saponification. They are in general very stable on storage, shaking or stirring and are highly resistant to the action of solutions of salts containing one or more polyvalent ions, as well as to repeated freezing and thawing. Stability and resistance are understood to be the nonoccurrence of coagulate, sheets or lumps and the like, either in the latex itself or at the surface in contact with air or in contact with walls of reactors, transport lines or storage vessels under the aforementioned conditions.

Latices prepared according to the invention can be processed to paints according to many recipes, by addition of pigments, fillers, thickening agents and the like. Addition of anti-foaming agents is in some cases desirable. Pigments and other auxiliary substances may be processed to pigment pastes, which can be homogenized by known methods and then mixed with latices according to the invention.

Latices according to the invention and latex paints prepared with them show very good adhesion to many materials such as wood (also after application of a primer), stone, concrete and asbestos cement. Paint coats prepared from such paints excel by great stability to chemical and mechanical influences, they have a low water absorption, they are highly resistant to the action of alkaline substances, such as concrete or alkaline detergents; they are also highly resistant to wet brushing with water or with detergents.

The invention is elucidated by some examples. The parts mentioned therein are parts by weight, unless otherwise stated. Some of the testing methods are described more fully.

The stability to stirring was investigated by stirring 50 ml. latex in a plastic cup with a horizontally fitted metal disc, diameter 3 cm., thickness 1.5 mm., the bottom of which was kept 1.5 cm. above the bottom of the cup. The speed was 10,000 r.p.m.

The stability to stirring was rated as excellent when after 30 minutes' stirring no coagulation had occurred.

The ion stability of latices was studied by adding an equal volume of 5 percent solutions of salts, such as sodium chloride, calcium chloride and potassium aluminum sulfate.

To evaluate the freeze-thaw stability latices were kept for 24 hours at $-20°$ C. and then for 24 hours at room temperature. This treatment was repeated 5 times.

To investigate stability to wet brushing pigmented latex paints were brushed on to roughened glass sheets. A nylon brush with area of 21 $cm.^2$ and loaded with a weight of 500 g. was moved mechanically over the continually water-wetted paint coat. The number of strokes with the brush after which the paint cracks is a measure of the mechanical stability. The brush resistance is rated as excellent when after 10,000 strokes the paint coat is still perfectly intact.

For the preparation of the branched monocarboxylic acids ($C_9$–$C_{11}$) the base material used was a mixture of olefins with 8–10 carbon atoms per molecule, obtained by thermal cracking of a paraffinic base material in the gas phase, in the presence of steam. The branched monocarboxylic acids were obtained by reaction of this olefin fraction with carbon monoxide and water in the presence of a catalyst prepared from phosphoric acid, boron trifluoride and water.

The vinyl esters of the afore-mentioned branched monocarboxylic acids were prepared by reaction of the acids with vinyl acetate in the presence of a mercury salt. The vinyl esters were distilled in a nitrogen stream and then stored with exclusion of air.

EXAMPLE I (A) *Preparation and investigation of the latex*

SOLUTION I

In 70 parts of water were dissolved
0.4 part of ammonium persulfate
0.95 part of borax
0.4 part of dodecylbenzenesulfonate
3 parts of nonylphenoxypolyethoxyethanol with on an average 20 ether groups per molecule
0.56 part of sodium hydroxide

SOLUTION II

In 30 parts of water were dissolved
0.6 part of dodecylbenzenesulfonate
0.1 part of ammonium persulfate
0.05 part of borax

MONOMER MIXTURE 59 parts of vinyl esters of branched monocarboxylic acids ($C_9$–$C_{11}$)
40 parts of vinyl chloride
1 part of acrylic acid Solution II was transferred to an enameled autoclave and heate dto 85–90° C. Subsequently Solution I and the monomer mixture were added dropwise with stirring simultaneously, each separately, to the contents of the autoclave in a period of 4 hours. After the latex had then been kept for another hour at a temperature of 85–90° C. it was cooled down in the autoclave to room temperature. The pH was 4.5; with 10% ammonia it was raised to 9. The average polymer particle size according to light scattering measurement was 2700 A. The solids content was about 50%.

The stability to stirring, the resistance to sodium chloride and calcium chloride, and the freeze-thaw stability were studied. These were excellent. Latex films with a thickness of 150 microns applied to glass sheets gave, after drying, homogeneous transparent coats.

(B) *Preparation and examination of white pigmented paint*

A pigment paste was prepared from 140 parts of water, 6.85 parts of a 25 percent solution of Tamol 731 (sodium salt of carboxylated polyelectrolyte), 1.02 parts of Triton X 102 (isooctylphenylpolyethoxyethanol), 60 parts of a 2 percent solution of methyl cellulose, 5 parts of preserving agent and 350 parts of pigment. The pigment composition was 5 parts of titanium white (rutile), 1 part of china clay and 1 part of tallow. The paste was homogenized on a paint three-roller mill.

The homogenized paste was added slowly with stirring to 393 parts of latex. The pigment volume concentration of this paint was 35%. The paint was stable at room temperature.

The latex paint was brushed on to sand-blasted glass sheets. After 1 week's drying at room temperature the paint film was resistant to the action of a 2 percent sodium hydroxide solution for 24 hours. The stability to wet brushing was excellent; even when 0.5% of a detergent containing secondary alkyl sulfate was dissolved in the water with which the paint film was wetted, the film was still resistant to an average of 10,000 strokes.

EXAMPLE II

Solution I and Solution II were prepared as in Example I.

MONOMER MIXTURE 64 parts of vinyl esters of branched monocarboxylic acids ($C_9$–$C_{11}$)
35 parts of vinyl chloride
1.2 parts of methacrylic acid Solution II was transferred to an enameled autoclave and heated to 75° C. Subsequently Solution I and the monomer mixture were added dropwise with stirring simultaneously, each separately, to the contents of the autoclave in a period of 4 hours. After the latex had then been kept for another hour at a temperature of 80° C. it was cooled in the autoclave to room temperature. The pH was 4.4; with 10% ammonia it was raised to 9. The solids content was about 50%. The stability of this latex was excellent. Latex films with a thickness of 150 microns applied to glass sheets gave, after drying, homogeneous transparent coats.

A white pigmented paint, prepared from the above-mentioned latex and from pigment paste according to Example I, gave paint films with excellent resistance to dilute caustic soda and wet brushing. Also the qualities as a concrete paint were excellent.

EXAMPLE III

Solution I and Solution II were prepared as in Example I.

MONOMER MIXTURE 50 parts of vinyl esters of branched monocarboxylic acids ($C_9$–$C_{11}$)
49 parts of vinyl chloride
3.1 parts of maleic acid monoisooctyl ester The latex was prepared as described in Example I. The pH of the latex was 4.5; with 10% ammonia it was raised to 9. The solids content was 50%. The stability of this latex was excellent.

EXAMPLE IV

Solution I was prepared as in Example I, but instead of 0.56 part of sodium hydroxide 1.12 parts of sodium hydroxide was applied.
Solution II was prepared as in Example I.

MONOMER MIXTURE 84 parts of vinyl esters of branched monocarboxylic acids ($C_9$–$C_{11}$)
15 parts of vinyl chloride
2 parts of acrylic acid
1.0 part of glycidyl esters of branched monocarboxylic acids ($C_9$–$C_{11}$)

The latex was prepared as described in Example I. The pH of the latex was 4.8. The solids contents was about 50%. The stability of this latex was excellent. A white pigmented paint, prepared as in Example I, gave excellent results as a concrete paint.

EXAMPLE V

SOLUTION I

In 70 parts of water were dissolved
0.8 part of potassium persulfate
0.95 part of borax
0.4 part of dodecylbenzenesulfonate
3 parts of nonylphenoxypolyethoxyethanol with on an average 20 ether groups per molecule
1.12 parts of sodium hydroxide

SOLUTION II

In 30 parts of water were dissolved
0.6 part of dodecylbenzenesulfonate
0.2 part of potassium persulfate
0.05 part of borax

MONOMER MIXTURE 64 parts of vinyl esters of branched monocarboxylic acids ($C_9$–$C_{11}$)
34 parts of vinyl chloride
2.4 parts of methacrylic acid The latex was prepared as described in Example I. The pH of the latex was 5.0; with 10% ammonia it was raised to 9. The solids content was about 50%. The stability of this latex was excellent. A white pigmented paint, prepared as in Example I, gave excellent results as a concrete paint.

EXAMPLE VI

SOLUTION I

In 70 parts of water were dissolved 0.4 part of potassium persulfate
0.4 part of dodecylbenzenesulfonate
3 parts of nonylphenoxypolyethoxyethanol with on an average 20 ether groups per molecule
0.96 part of potassium carbonate

SOLUTION II

In 30 parts of water were dissolved 0.6 part of dodecylbenzenesulfonate
0.1 part of potassium persulfate
0.04 part of potassium carbonate

MONOMER MIXTURE 64 parts of vinyl esters of branched monocarboxylic acids ($C_9$–$C_{11}$)
35 parts of vinyl chloride
1 part of acrylic acid The latex was prepared as described in Example I, but addition was now completed in 2 hours instead of in 4 hours. The pH of the latex was raised to 9 with 10% ammonia. The stability of this latex was excellent. A white pigmented paint, prepared as in Example I, gave excellent results as a concrete paint.

EXAMPLE VII

The latex preparation of Example VI was repeated, but addition was now completed in 1 hour instead of in 2 hours. The pH of the latex was raised to 9 with 10% ammonia. The stability of this latex was excellent. A white pigmented paint, prepared as in Example I, gave excellent results as a concrete paint.

EXAMPLE VIII

The latex was prepared with Solution I, Solution II and the monomer mixture from Example VI.
Solution II was transferred to an enameled autoclave and heated to 85–90° C. Subsequently the monomer mixture was emulsified in Solution I and this emulsion was added dropwise wtih stirring to the autoclave contents in
added dropwise with stirring to the autoclave contents in
a period of 2 hours. After the latex had then been kept at
85–90° C. for another hour it was cooled in the autoclave
to room temperature. The pH was 4.5; with 10% ammonia
it was raised to 9.

The stability of this latex was excellent. A white pigmented paint, prepared as in Example I, gave excellent results as a concrete paint.

EXAMPLE IX

SOLUTION I

In 100 parts of water were dissolved 0.5 part of ammonium sulfate
1 part of potassium carbonate
1 part of dodecylbenzenesulfonate
3 parts of nonylphenoxypolyethoxyethanol with on an average 20 ether groups per molecule

MONOMER MIXTURE 64 parts of vinyl ester of branched monocarboxylic acids ($C_9$–$C_{11}$)
35 parts of vinyl chloride
1 part of acrylic acid The monomer mixture was emulsified in Solution I. One quarter of this emulsion was transferred to an enameled autoclave and heated rapidly to 70° C. After 15 minutes the remaining part of the emulsion was added dropwise with stirring to the autoclave contents in a period of 3 hours. After the latex had then been kept for another hour at a temperature of 75° C. it was cooled in the autoclave to room temperature. The pH was 4.3; with 10% ammonia it was raised to 9.

The stability of this latex was excellent. A white pigmented paint, prepared as in Example I, gave excellent results as a concrete paint.

EXAMPLE X

A monomer emulsion was prepared as described in Example IX. This emulsion was passed at a rate of 50 ml. per hour continuously in a reactor kept at 75° C. The volume of the reactor was 200 ml. The dispersion in the reactor was kept homogeneous by stirring. Subsequently the dispersion was kept at 80° C. for one hour to complete the polymerization. Then the latex was cooled to room temperature. The pH was 4.2. Subsequently 2 parts of an epoxy resin, with an epoxy equivalent weight of 260, per 100 parts of solid matter was stirred through the latex. The epoxy resin was applied in the form of a 50% solution in toluene.

The stability of the latex was excellent. A white pigmented paint prepared as in Example I gave excellent results as a concrete paint.

We claim as our invention:

1. A process for preparing mechanically stable, freeze-tolerant latices which comprises copolymerizing in aqueous emulsion (1) 100 parts by weight of vinyl chloride with (2) from 50 to 900 parts by weight of vinyl esters of alpha-branched saturated, aliphatic monocarboxylic acids containing from 9 to 19 carbon atoms and prepared by reacting olefins with carbon monoxide and water in the presence of liquid acid catalysts and having the general formula:

$$R_3-\underset{R_2}{\underset{|}{\overset{R_1}{\overset{|}{C}}}}-\overset{O}{\overset{\|}{C}}-OH$$

wherein $R_1$ and $R_2$ are alkyl radicals and $R_3$ is selected from the group consisting of hydrogen and alkyl radicals in the presence of (A) from 0.5 to 5 parts by weight per 100 parts by weight of (1) and (2) of a compound selected from the group consisting of alpha-beta-unsaturated carboxylic acids, partial carboxylic esters containing two carbon atoms linked by a double bond, at least one of which is directly attached to a carboxylic group, and the salts and anhydrides of said carboxylic acids and partial carboxylic esters, and (B) surfactants consisting essentially of surface-active agents containing one anionic group per molecule and of nonionic surface-active agents.

2. A process as in claim 1 wherein the vinyl esters have been obtained from alpha-branched saturated aliphatic monocarboxylic acids containing from 9–11 carbon atoms in the molecule.

3. A process as in claim 1 wherein the copolymerization is carried out in the presence of an alpha-beta-unsaturated monocarboxylic acid.

4. A process as in claim 3 wherein the alpha-beta-unsaturated carboxylic acid is acrylic acid.

5. A process as in claim 3 wherein the alpha-beta-unsaturated carboxylic acid is methacrylic acid.

6. A process as in claim 1 wherein the anionic surface-active agent is an alkylaryl sulfonate.

7. A process as in claim 1 wherein the nonionic surface-active agents are reaction products of hydroxy compounds with alkylene oxides.

8. A process as in claim 7 wherein the hydroxy compounds are phenols.

9. A process as in claim 1 wherein the nonionic surface-active agent is the reaction product of an alkylphenol with ethylene oxide, said reaction product having the general formula:

$$R-C_6H_4-O-(CH_2-CH_2-O)_n-H$$

wherein R is an alkyl group with from 6 to 18 carbon atoms and $n$ is a number between about 6 and 40.

References Cited

UNITED STATES PATENTS

| | | | |
|---|---|---|---|
| 2,329,456 | 9/1943 | Campbell | 260—80.5 |
| 2,979,480 | 4/1961 | Piloni et al. | 260—78.5 |
| 3,080,333 | 3/1963 | Kray et al. | 260—29.6 |
| 3,150,110 | 9/1964 | Becker et al. | 260—29.6 |
| 3,166,534 | 1/1965 | Perrins | 260—80.5 |
| 2,753,318 | 7/1956 | Maeder | 260—29.7 |
| 2,795,564 | 6/1957 | Conn et al. | 260—29.6 |
| 2,976,167 | 3/1961 | Maeder et al. | 260—29.6 |

SAMUEL H. BLECH, *Primary Examiner.*

J. ZIEGLER, *Assistant Examiner.*